Figure 4:
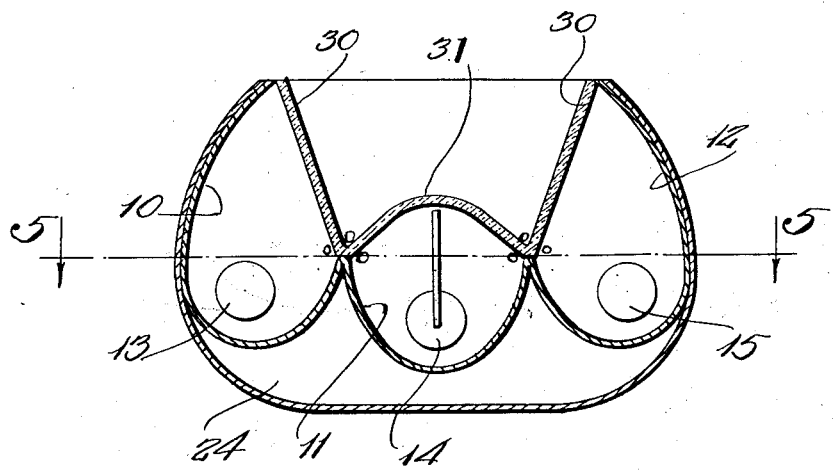

Jan. 3, 1928.
L. L. WAGNER
1,655,399
AUTOMOBILE LAMP
Filed Dec. 3, 1926
2 Sheets-Sheet 1
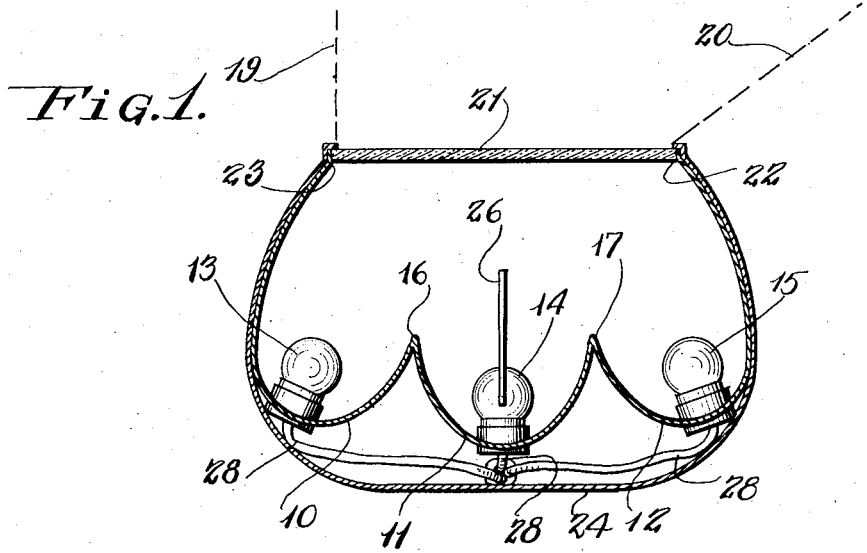
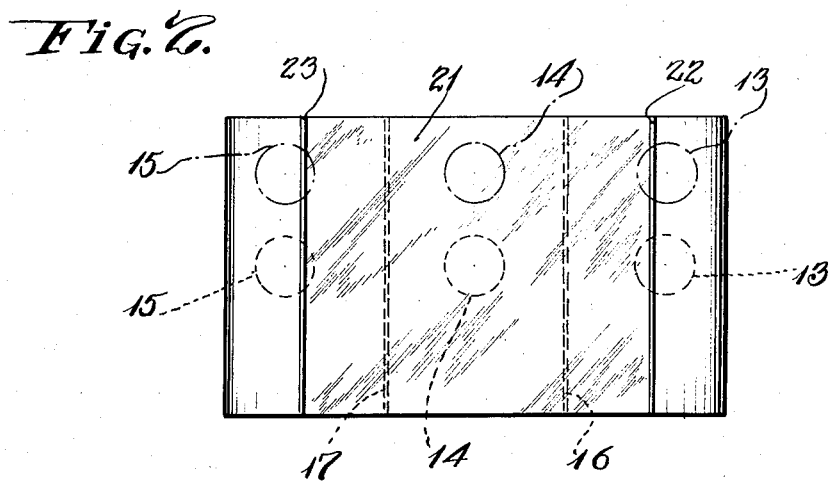
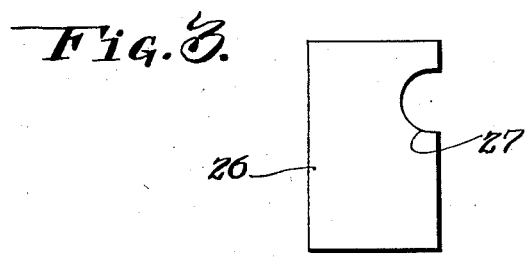
Inventor
L. L. Wagner
by
A. B. Foster
Attorney Jan. 3, 1928. 1,655,399

L. L. WAGNER

AUTOMOBILE LAMP

Filed Dec. 3, 1926  2 Sheets-Sheet 2

L. L. Wagner
Inventor

By A. B. Forter
Attorney

Patented Jan. 3, 1928.

1,655,399

UNITED STATES PATENT OFFICE.

LAWSON L. WAGNER, OF NEW YORK, N. Y.

AUTOMOBILE LAMP.

Application filed December 3, 1926. Serial No. 152,472.

At present there are being manufactured many automobile headlights intended to properly illuminate the road immediately in front of the car using them, especially that portion of the road termed the "shoulder" (or extreme outside of the road) together with the territory contiguous thereto, yet at the same time shield the eyes of any approaching motorist from the glare resulting from lamps producing sufficient light to make ordinary night driving safe. So far, no lamp has been devised that successfully meets all of these conditions. Through faulty placement of lamps or design of reflecting surfaces, a large proportion of the light produced is allowed to shine in an approaching motorist's eyes either directly or by direct reflection. Due to the use of round "bullseye" types of lenses it is impossible to get sufficient illumination directly in front of the lamps without distributing a great deal of light to both sides.

The present invention relates to automobile headlights, and has for its object to produce an automobile headlight which may take the place of the ordinary headlight lamps on automobiles, or it may be supplemental thereto, the said novel headlight being provided with preferably three lamps (say bulbs or illuminating bodies) and so arranged that these lamps are separately operable so as to illuminate either one side of the road only, both sides, the center (as in the ordinary headlight) or any combination of the three. The form of the headlight is particularly designed for use when it is desired to illuminate one side of the road, say the right hand side of the road, without throwing the light in the faces of autoists coming from the opposite direction or facing it, who would naturally be on the opposite side of the road. The device is also adapted for use in illuminating the left hand side of the road which is very desirable when turning a sharp left hand curve or in sections where vehicles pass to the left of one another, or to brightly illuminate the sides of the road as well as directly in front such as for instance when passing through fog or where road conditions are bad and a very high degree of visibility is necessary for safe driving.

Several forms of the invention are illustrated in the annexed drawing, by way of illustration and without intending to limit the invention to these specific modifications. In said drawing Fig. 1 is a horizonal section of one form. Fig. 2 is a front view thereof and Fig. 3 is a detail showing a dividing screen which may be used if desired, although this can be omitted if desired.

Figure 5:
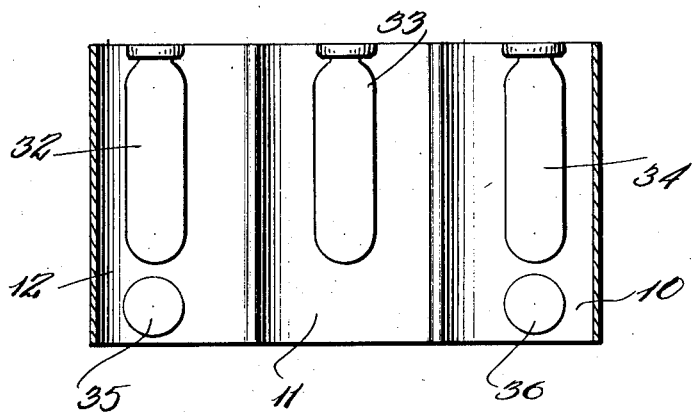

Fig. 4 is a horizontal section of a modification showing transparent members located differently from what is shown in Fig. 1. Fig. 5 is a central vertical section of a modification showing tubular lamps, also showing colored lamps that may be used in conjunction therewith if desired.

As illustrated in Fig. 1, three parabolic reflectors 10, 11 and 12 are placed in the rear part of the housing of the lamp, and in each of these, preferably at or near the focus thereof, are placed lamps 13, 14 and 15. These lamps may be of equal size and candlepower or not as desired. The reflectors 10 and 11 meet at the vertical line 16, and the reflectors 11 and 12 meet at the vertical line 17. Assuming only the lamp 13 to be burning, the light therefrom will be cut off by the vertical meeting line 16 of these two reflectors, so that light will be thrown ahead, and to the right hand side only, namely the angle between the dotted line 19 and 20 only will be illuminated. No light will be reflected to the left of the line 19, by other parts of the reflectors. Neither will any direct rays of light pass beyond this line, but the full intensity can be confined to within the field of illumination as noted. The vertical lines 22 and 23 indicate the meeting edges of the lamp casing with the vertical sides of the glass front, and the said vertical edges, acting more or less as a shield assist materially in directing the light in the way indicated.

Located in the front of the casing 5 is a suitable transparent member 21, which may be plain glass and does not have to be corrugated or plated, although it may be if so desired, for throwing the light downwardly as much as possible or otherwise directing the rays of light without defeating the principal purpose of the invention. The side edges of this glass, and the holding casing, are made vertical as illustrated more clearly in Fig. 2.

It is also possible and within the scope of this invention to protect the three reflectors by separate transparent screens 30 (Fig. 4) instead of the front glass 21.

The top and bottom of the casing may be horizontal, or if desired may be of other shapes. In some cases it might be advisable to make the bottom of such shape as to enable it to fit readily upon the front fender or mud guard of the automobile or other place of fixture. Also the casing may be made any other shape than round, as shown at 24, without departing from the scope of the present invention, for instance to produce a pleasing external appearance. I desire also to be able to use such satisfactory means of ventilating said headlight by either radiating surfaces or supplying means for cooling currents of air to pass through or over such heated sections as may need ventilation. In some cases it might be advisable to use a single headlight of this kind, placed in front of the radiator and above and back of the bumper or upon the mud-guard of the front wheel of an automobile or motorcycle, in which cases the said lamp may be a substitute for or in addition to the usual side lamps.

In some cases, in order to more effectively direct the light in the directions above indicated, there may be provided a vertical forwardly extending card or plate 26, provided with a notch 27 for receiving the lamp. The length of this device should be such as to cut off any light from the lamp 13 from reaching the reflector 12 or from reaching any portion of the right half of the reflector 11 or the reverse order when lamp 15 is lighted. This will not in any way interfere with the light from the bulb 14, which will pass on both sides of the said dividing plate.

The device 26 may be a piece of thin sheet metal preferably coated with flat (dull) black paint or other non-reflecting pigment or it may be any conveniently rigid, thin and non-reflecting material. When this device is used in connection with alternate transparencies 30 already described, the center section 31 can be curved or otherwise conveniently arranged to accommodate itself to position of said device 26. If the device 26 is not used, the transparent element 31 may be flat or plain glass.

The three lamps 13, 14 and 15 (in Figs. 1 and 2) may be located at any convenient height in the casing, and for some cases I preferably locate these all in the upper end of the casing, as indicated in Fig. 2. However in some cases it may be advisable to have the lamp 14 in the upper part of the casing, and the lamps 13 and 15 lower down, say about the middle. In some cases it may be advisable to have a downwardly sloping top to the device, with the lamps located at a level slightly above the top of the glass 21, in order to throw the light in a downward direction, from the said lamp. In this way the lamp may be made to illuminate the road without directing any substantial amount of light upwardly. In many cases it is more advisable to place all three of the lamps, or particularly the lamps 13 and 15, about midway of the height of the casing. It will be understood that all of the lamps are provided with suitable lead wires 28, leading to suitably located switches, for example these may be located on the dashboard or steering wheel of the automobile.

As shown in Fig. 5, the lamps 32, 33 and 34 may be tubular in form, and these may if desired be of clear glass, and other lamps 35, 36 having colored (say amber) glass bulbs can be located just below these tubular lamps.

It will be understood that the focus of any one of the reflectors 10, 11, 12 is a vertical line, and the tubular lamps are preferably placed approximately coincident therewith.

I have above spoken of illuminating the road ahead of the car and on the side, but it will be understood that the lamps 13 and 15, if preferably positioned about midway of the height of the casing of the lamps 32, 33, 34, if used, will preferably illuminate also the fences, trees and sign posts and other objects at the side of the road.

From the foregoing description it is readily seen that no light except the negligible amount due to diffusion through the front lens, etc., can possibly reach the eyes of any properly approaching motorist. Where it is desirable to overcome the effect of even this very small amount of light together with that which might be reflected from the approaching motorist's own headlights, assuming they are not of the design described herein, it is then convenient to place a low-power supplementary bulb 35 and 36 above, below or in back of (in the case of the tubular bulb) the lamp producing the principal source of illumination. This bulb or bulbs is preferably of colored glass such for instance as amber glass or some other equally restful color which is not glaring to the eyes. It can be placed so that it is within the focus of the containing reflectors as 10, 11 or 12 or it may have an individual reflector such that will cast its beam to the opposite side of the road from its position in the headlight ensemble. Its use and operation are thus:—for instance, when lamp 13 is switched on, by itself, the colored lamp in section enclosed by reflector 12 is also lighted; this gives the proper intensity of bright light where needed by the driver of the vehicle equipped with the device and at the same time directs a beam of non-glaring light of much lower intensity directly in the path of the oncoming vehicle. This intercepts and neutralizes any and all objectionable light that may be directed towards said approaching vehicle.

I claim:—

1. An automobile lamp including a central vertically disposed trough-like reflector and a pair of similar vertically disposed trough-like reflectors, the last reflectors being located one on each side of the central reflector and having focal planes converging to a common line of intersection, the central reflector having a focal plane passing through the line of intersection of the converging planes of the side reflectors, and illuminating means at the focus of each reflector.

2. An automobile lamp including a central vertically disposed trough-like reflector and a pair of similar vertically disposed trough-like reflectors, the last reflectors being located one on each side of the central reflector and having focal planes converging to a common line of intersection, the central reflector having a focal plane passing through the line of intersection of the converging planes of the side reflectors, said side reflectors having their outer sides elongated and inwardly curved to extend well beyond the inner sides of the side reflectors and beyond the central reflector, and illuminating means at the focus of each reflector.

3. An automobile lamp including a central vertically disposed trough-like reflector and a pair of similar vertically disposed trough-like reflectors, the last reflector being located one on each side of the central reflector and having focal planes converging to a common line of intersection, the central reflector having a focal plane passing through the line of intersection of the converging planes of the side reflectors, illuminating means at the focus of each reflector, and an opaque plate extending forwardly from the illuminating means of the central reflector and lying in the focal plane of said central reflector.

4. An automobile lamp including a central vertically disposed trough-like reflector and a pair of similar vertically disposed trough-like reflectors, the last reflector being located one on each side of the central reflector and having focal planes converging to a common line of intersection, the central reflector having a focal plane passing through the line of intersection of the converging planes of the side reflectors, said side reflectors having their outer sides elongated and inwardly curved to extend well beyond the inner sides of the side reflectors and beyond the central reflector, illuminating means at the focus of each reflector, and an opaque plate extending forwardly from the illuminating means of the central reflector and lying in the focal plane of said central reflector.

5. An automobile lamp including a central vertically disposed trough-like reflector and a pair of similar vertically disposed trough-like reflectors, the last reflectors being located one on each side of the central reflector and having focal planes converging to a common line of intersection, the central reflector having a focal plane passing through the line of intersection of the converging planes of the side reflectors, and illuminating means at the focus of each reflector, the remote sides of the pair of reflectors converging inwardly in front of the illuminating means at the foci of said pair of reflectors to such extent that the illuminating means lie behind and are hidden by said sides from direct front vision.

In testimony whereof I affix my signature.

LAWSON L. WAGNER.